United States Patent
Yumita et al.

(10) Patent No.: US 6,956,306 B2
(45) Date of Patent: Oct. 18, 2005

(54) LINEAR ACTUATOR, AND PUMP DEVICE AND COMPRESSOR DEVICE USING THE SAME

(75) Inventors: Yukinobu Yumita, Nagano (JP); Hideaki Ito, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 39 days.

(21) Appl. No.: 10/796,843

(22) Filed: Mar. 8, 2004

(65) Prior Publication Data
US 2004/0232777 A1  Nov. 25, 2004

(30) Foreign Application Priority Data
Mar. 18, 2003  (JP) ............................... 2003-073342

(51) Int. Cl.[7] ............................................ H02K 41/00
(52) U.S. Cl. ............................ 310/12; 310/13; 310/15; 417/415; 417/416; 417/417; 318/135
(58) Field of Search ............................... 310/12, 13, 15; 417/44.1, 415, 417, 416; 318/135

(56) References Cited

U.S. PATENT DOCUMENTS

| | | | |
|---|---|---|---|
| 4,602,174 A | 7/1986 | Redlich | |
| 6,540,485 B2 * | 4/2003 | Nara et al. | 417/44.1 |
| 6,626,651 B2 * | 9/2003 | Akazawa et al. | 417/417 |
| 6,809,434 B1 * | 10/2004 | Duncan et al. | 310/12 |
| 6,838,788 B2 * | 1/2005 | Park et al. | 310/12 |
| 6,879,064 B2 * | 4/2005 | Kobayashi et al. | 310/12 |

* cited by examiner

Primary Examiner—Darren Schuberg
Assistant Examiner—Iraj A. Mohandesi
(74) Attorney, Agent, or Firm—Reed Smith LLP (57) ABSTRACT

A linear actuator includes an inner yoke, an outer yoke and a coil for generating a magnetic field between the outer yoke and the inner yoke. The outer yoke includes a first facing portion facing the inner yoke and a second facing portion which faces the inner yoke. An insulating coil bobbin around which the coil is wound includes an engaging part which engages with both the first facing portion and the second facing portion of the outer yoke. A magnet is disposed between the inner yoke and the outer yoke and a movable body is integrally connected with the magnet. An alternating magnetic field is generated by the coil such that the movable body along with the magnet is reciprocally moved in the axial direction in conjunction with the alternating magnetic field.

20 Claims, 5 Drawing Sheets

LINEAR ACTUATOR, AND PUMP DEVICE AND COMPRESSOR DEVICE USING THE SAME

CROSS REFERENCE TO RELATED APPLICATIONS

This application claims priority to Japanese Application No. 2003-073342, filed Mar. 18, 2003, which is incorporated herein by reference.

BACKGROUND OF THE INVENTION

1. Field of the Invention

The present invention relates to a linear actuator, and a pump device and a compressor device using the linear actuator.

2. Description of Related Art

A linear actuator, which is used in a pump device or a compressor device with a piston linearly moving within a cylinder, commonly uses a motor outputting a rotational movement. Therefore, a crankshaft is used between the output shaft of the motor and the piston to convert the rotational movement into a linear movement by using the crankshaft. Accordingly, the transmission efficiency of force is low.

Figure 5:
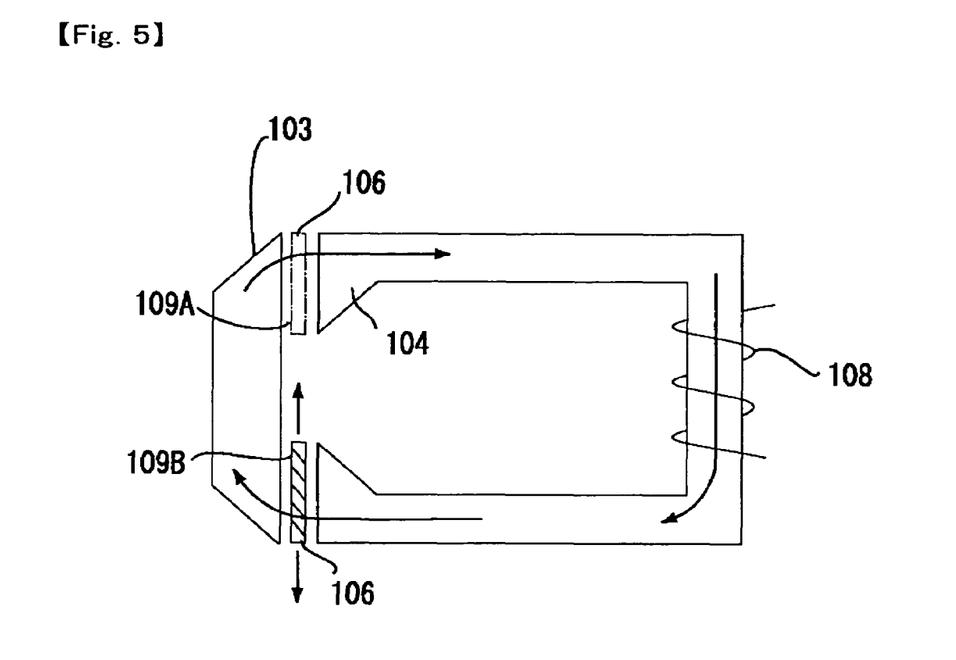
FIG. 5 is an explanatory view of a conventional linear actuator.

Alternatively, as shown in FIG. 5, a linear actuator has been known which includes an inner yoke 103, an outer yoke 104, a coil 108 and a movable body 106. The outer yoke 104 is disposed so as to face the inner yoke 103 with a predetermined gap space in a direction perpendicular to an axial direction which is the moving direction of the movable body 106. A first gap space 109A and a second gap space 109B are formed between the inner yoke 103 and the outer yoke 104. The coil 108 is used to generate the alternating magnetic field whose magnetic path is formed by the outer yoke 104, the first gap space 109A, the inner yoke 103 and the second gap space 109B. The movable body 106 disposed between the inner yoke 103 and the outer yoke 104 is alternately driven in the axial direction by the alternating magnetic field.

However, in the linear actuator constituted as shown in FIG. 5, the facing portions of the outer yoke 104 to the inner yoke 103 may be displaced by the attraction force of the movable body, i.e., a magnet 106 to cause to be brought into contact with the magnet 106. In addition, whenever the magnet 106 moves in the axial direction, the portion of the facing portions of the outer yoke 104 which is attracted by the magnet 106 is counterchanged alternately. Therefore, when the magnet 106 is driven and moved alternately in the axial direction at a high speed as in the case used in a pump device or a compressor device, the magnetic vibration may occur.

SUMMARY OF THE INVENTION

In view of the problems described above, it is advantage of the present invention to provide a linear actuator capable of preventing the facing portion of an outer yoke to an inner yoke from being displaced by the attraction force of a magnet, and also provide a pump device and a compressor device using the above-mentioned linear actuator.

In order to achieve the above advantage, according to an embodiment of the present invention, there is provided a linear actuator including an inner yoke, an outer yoke which is arranged so as to form a prescribed gap space to an outer peripheral face of the inner yoke, a coil for generating a magnetic field between the outer yoke and the inner yoke, an insulating coil bobbin around which the coil is wound, a magnet which is disposed in the prescribed gap space between the inner yoke and the outer yoke, and a movable body integrally connected with the magnet capable of moving in an axial direction. The outer yoke is provided with a first facing portion and a second facing portion which respectively face the inner yoke. The second facing portion is formed to be separated from the first facing portion in the axial direction and the coil bobbin is provided with an engaging part which engages with both the first facing portion and the second facing portion of the outer yoke.

In the linear actuator in accordance with an embodiment of the present invention, for example, when an alternating current is applied to the coil, an alternating magnetic field is generated between the outer yoke and the inner yoke and thus the movable body is moved back and forth in the axial direction corresponding to the alternating magnetic field. Therefore, the movable body can be reciprocally and linearly moved. Further, the coil bobbin around which the coil is wound is provided with the engaging part which engages with both the first facing portion and the second facing portion of the outer yoke and thus the first facing portion and the second facing portion are not displaced by the attraction force of the magnet. Accordingly, even when the portion of two facing portions which is attracted by the magnet is alternately replaced, the magnetic vibration does not generate.

In the linear actuator in accordance with an embodiment of the present invention, the outer yoke is arranged around the inner yoke so as to form a first gap space and a second gap space with respect to an outer peripheral face of the inner yoke and the coil is energized so as to generate an alternating magnetic field at the first gap space and the second gap space. In this case, the outer yoke, the first gap space, the inner yoke, the second gap space and the above-mentioned outer yoke are constituted to form the magnetic path. The outer yoke is formed so as to extend from a portion located on the outer peripheral side of the coil to the first facing portion for forming the first gap space and to the second facing portion for forming the second gap space on the inner peripheral side of the coil over the upper or lower ends of the coil. The coil is wound around the insulating coil bobbin which is used for the insulation between the first and the second facing portions of the outer yoke and the coil. The coil bobbin includes an engaging part which engages with both the first and the second facing portions of the outer yoke for preventing the facing portions from being displaced by the attraction force of the magnet.

In the linear actuator in accordance with an embodiment of the present invention, when an alternating current is applied to the coil, an alternating magnetic field is generated in the magnetic path which is formed of the outer yoke, the first gap space, the inner yoke, the second gap space and the above-mentioned outer yoke. Therefore, the movable body is moved back and forth in the axial direction corresponding to the alternating magnetic field.

In accordance with an embodiment of the present invention, the engaging part includes an engaging protrusion part protruding toward the inner yoke side from the coil bobbin and a front end portion of the first facing portion and a front end portion of the second facing portion of the outer yoke respectively engage with the engaging protrusion part from both sides in the axial direction.

In accordance with an embodiment of the present invention, the outer yoke includes a first outer yoke member and a second outer yoke member which are respectively formed in a U-shaped cross-section so as to cover the coil from both sides in the axial direction. The first outer yoke member and the second outer yoke member are constituted in such a manner that both end portions abut with each other at a portion located on the outer peripheral side of the coil while the front end portion of the first facing portion and the front end portion of the second facing portion located on the inner peripheral side of the coil respectively engage with the engaging protrusion part from both sides in the axial direction. In this case, prescribed clearances in the axial direction are preferably formed between the respective front end portions of the first and the second facing portions and the engaging protrusion part. According to the embodiment constituted above, both the end portions of the first outer yoke member and the second outer yoke member surely abut with each other at the portion located on the outer peripheral side of the coil and thus, even when the outer yoke is constituted by using two yoke members, the magnetic path in the outer yoke is surely formed.

In accordance with an embodiment of the present invention, the front end portion of the first facing portion and the front end portion of the second facing portion of the outer yoke are respectively formed with engaging recessed parts, each of which engages with the engaging protrusion part provided in the coil bobbin. The engaging protrusion part is preferably provided with a small projecting part protruding toward the inner yoke side from the position of the engaging recessed parts provided in the front end portions of the first and the second facing portions. According to the embodiment constituted above, for example, even when the first and the second facing portions vibrate in the axial direction due to the external vibration, their separated state is maintained.

Further, in accordance with an embodiment of the present invention, prescribed clearances in the axial direction are preferably provided between the front end portions of the first and the second facing portions and the engaging protrusion part. According to the embodiment constituted above, the first outer yoke member and the second outer yoke member surely abut with each other at end portions located on the outer peripheral side of the coil and thus the magnetic path is surely formed even when the outer yoke is constituted of two yoke members.

The linear actuator in accordance with the present invention is preferably used as a pump device or a compressor device for supplying various kinds of fluids.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

A linear actuator in accordance with an embodiment of the present invention will be described below with reference to the accompanying drawings.

Entire Constitution

Figure 1:
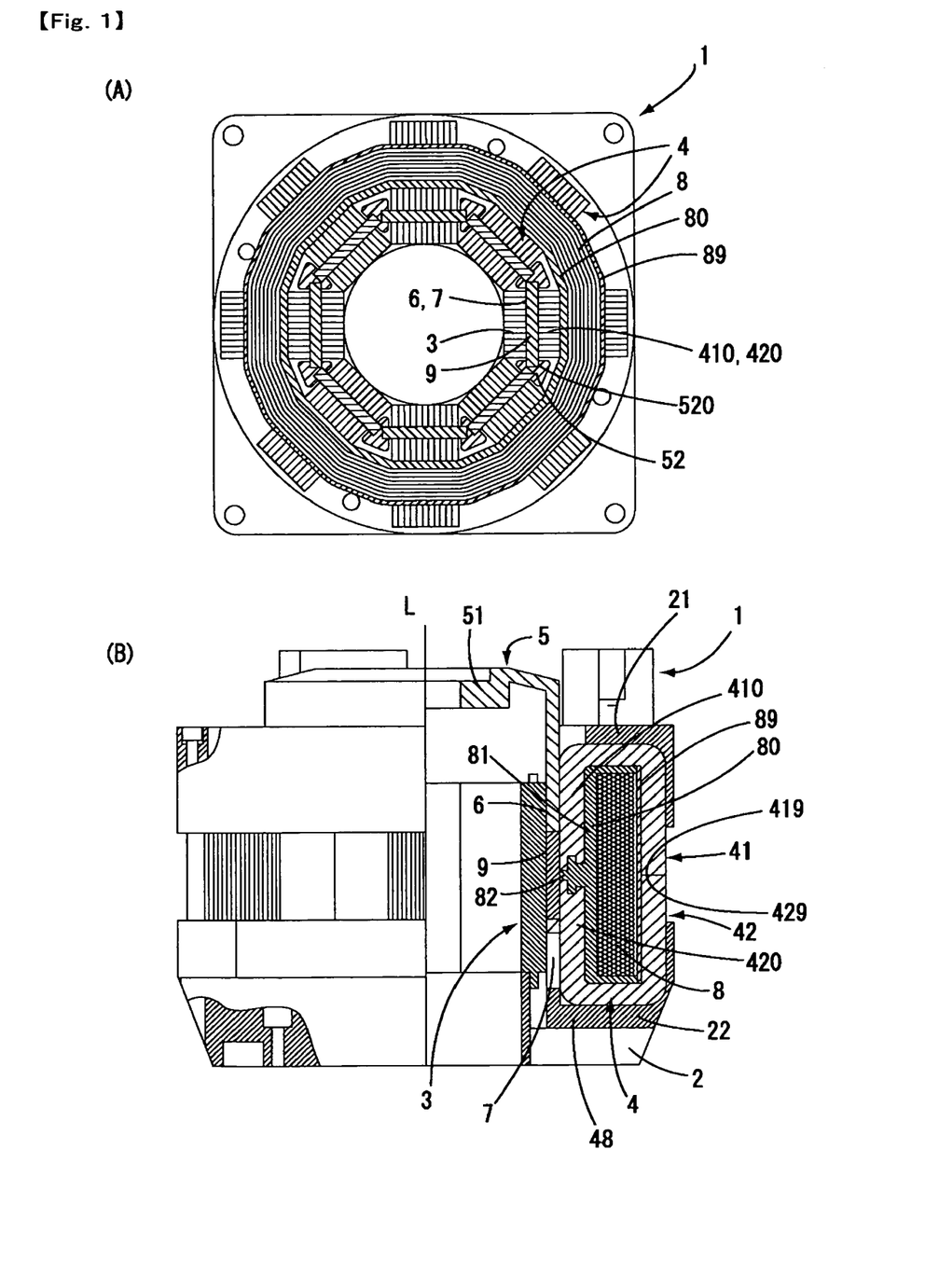
FIG. 1(A) is a transverse cross-sectional view of a linear actuator in accordance with an embodiment of the present invention.
FIG. 1(B) is a half side cross-sectional view of the linear actuator in FIG. 1(A).

FIG. 1(A) is a transverse cross-sectional view of a linear actuator in accordance with an embodiment of the present invention. FIG. 1(B) is a side view of the linear actuator in FIG. 1(A) with the right half side of the linear actuator being shown in cross section.

In FIGS. 1(A) and 1(B), the linear actuator 1 in the embodiment of the present invention is used for a pump device or a compressor device for supplying various types of fluids. The linear actuator 1 includes a frame 2 for holding a stator and a movable body 5 capable of reciprocating with respect to the frame 2 along the axial line "L".

In the embodiment of the present invention, on the frame 2 are mounted an inner yoke 3, an outer yoke 4 disposed on an outer side of the inner yoke 3, and a coil 8 disposed inside of the outer yoke 4. The movable body 5 is integrally formed with a magnet 9; which is disposed between the inner yoke 3 and the outer yoke 4. A bottom part 51 (upper part in the drawing) of the movable body 5 is constituted to be a fixing part for connecting with an actuating shaft (not shown) formed in a round bar shape or a cylindrical shape.

In the embodiment of the present invention, the inner yoke 3 is constituted so as to be divided into eight pieces and disposed at respective positions corresponding to eight sides of a regular octagon when viewed in the axial direction as shown in FIG. 1(A). The eight pieces of the inner yoke 3 are arranged at equal angles in the peripheral direction. Each piece of the inner yoke 3 is formed into a flat board shape made of laminated magnetic plates. The outer face of each piece of the inner yoke 3 opposing to the outer yoke 4 and its rear face (inner face) are formed in a flat face.

The outer yoke 4 is also constituted so as to be divided into eight pieces and disposed at respective positions corresponding to eight sides of a regular octagon when viewed in the axial direction. The eight pieces of the outer yoke 4 are arranged at equal angles in the peripheral direction.

Each piece of the outer yoke 4 is constituted of a first outer yoke member 41 and a second outer yoke member 42. Each of the first and the second outer yoke members 41 and 42 is formed in a U-shaped cross section and they are vertically superposed to each other. In the embodiment of the present invention, each of the first and the second outer yoke members 41 and 42 is formed of a laminated body made of magnetic plates.

The first and the second outer yoke members 41 and 42 are respectively formed so as to extend from a portion located on the outer peripheral side of the coil 8 to a portion opposing to the outer peripheral face of the inner yoke 3 through an upper or lower intermediate connecting portion over the coil 8. The portions opposing to the outer peripheral face of the inner yoke 3 are respectively formed as a first facing portion 410 and a second facing portion 420. A first gap space 6 is formed so as to separate the outer peripheral face of the inner yoke 3 from the first facing portion 410 and a second gap space 7 is formed so as to separate the outer peripheral face of the inner yoke 3 from the second facing portion 420 in the axial direction. The end parts 419 and 429 of the first and the second outer yoke members 41 and 42 abut with each other on the outer peripheral side of the coil 8.

The outer yoke 4 constituted as described above is held and fixed by holders 21 and 22.

The magnet 9 integrally connected to the movable body 5 is made of a rare-earth magnet such as Nd—Fe—B system or a resin magnet. The magnet 9 is also constituted so as to be divided into eight pieces and disposed at respective positions corresponding to eight sides of a regular octagon when viewed in the axial direction as shown in FIG. 1(A). The eight pieces of the magnet 9 are arranged at equal angles in the peripheral direction. The movable body 5 is arranged in such a manner that the respective pieces of the magnet 9 are located so as to position over the area of both the first gap space 6 and the second gap space 7 formed between the inner yoke 3 and the outer yoke 4. The front and rear faces of the respective pieces of the magnet 9 are respectively magnetized to be opposite magnetic poles.

Each piece of the magnet 9 is formed in a planar shape and held by a magnet holding part 52 made of resin as shown in FIG. 1(A), which is formed in the movable body 5. In other words, each piece of the magnet 9 is held such that each side end portion of the magnet 9 is inserted into a groove 520 formed in the magnet holding part 52. The magnet holding part 52 is formed in a roughly triangular shape when viewed in the axial direction. The portion corresponding to an apex of the triangle is positioned in a wedge-shaped manner between adjacent pieces of the inner yoke 3. The portion corresponding to the base side of the triangle is positioned between adjacent pieces of the outer yoke 4.

A coil bobbin 80 made of a resin molded product is disposed in a space constituted between the first and the second outer yoke members 41 and 42 of the outer yoke 4. A coil 8 is wound around a trunk part 81 of the coil bobbin 80. The outer portion of the coil 8 wound around the coil bobbin 80 is protected by a cover 89 made of resin.

Engaging Structure of Coil Bobbin and Outer Yoke

Figure 2:
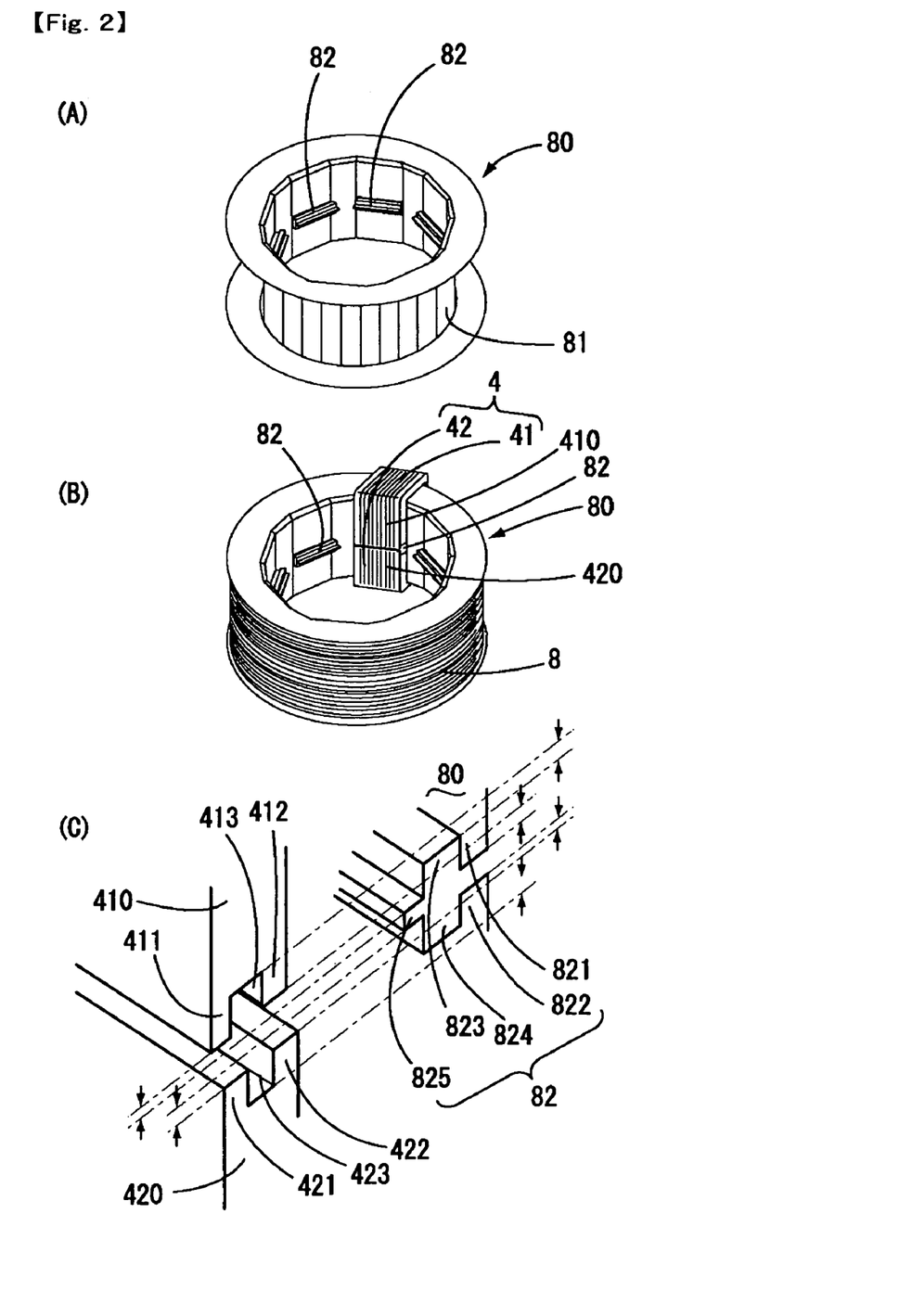
FIG. 2(A) is a perspective view of a coil bobbin used in the linear actuator in accordance with the embodiment of the present invention.
FIG. 2(B) is a perspective view of a coil device in which an outer yoke is mounted on the coil bobbin.
FIG. 2(C) is an explanatory perspective view which shows an important portion of the coil bobbin and end portions of the outer yoke.

FIG. 2(A) is a perspective view of the coil bobbin used in the linear actuator to which the present invention is applied. FIG. 2(B) is a perspective view of a coil device in which a pair of pieces of the outer yoke is mounted on the coil bobbin. FIG. 2(C) is an explanatory perspective view which shows the important portion of the coil bobbin and the end portions of the pair of pieces of the outer yoke.

In the linear actuator 1 of the embodiment of the present invention, the trunk part 81 of the coil bobbin 80 ensures insulation between the coil 8 and the first facing portion 410 or the second facing portion 420 of the outer yoke 4.

Also, as shown in FIGS. 2(A) and 2(B), engaging protrusion parts 82 protruding toward the inner yoke 3 are formed on the inner peripheral surface of the trunk part 81 so as to correspond to eight pieces of the outer yoke 4. The engaging protrusion part 82 engages with both the first facing portion 410 and the second facing portion 420 and serves as an engaging part for preventing the first and second facing portions 410 and 420 from being attracted to the magnet 9 and displaced.

The engaging protrusion part 82 includes upper and lower protrusion parts 823 and 824 which are formed so as to protrude in the axial direction to form recessed parts 821 and 822 opening in the axial direction between the inner peripheral face of the trunk part 81 and the respective upper and lower protrusion parts 823 and 824. In addition, the engaging protrusion part 82 includes a small projecting part 825 which is formed to be projected toward the inner yoke 3 side from the upper and lower protrusion parts 823 and 824 so as to be positioned between the lower end face of the first facing portion 410 and the upper end face of the second facing portion 420 on the inner yoke 3 side.

On the other hand, the inner peripheral side projecting part 411 and the outer peripheral side projecting part 412 are respectively formed at the lower end part of the first facing portion 410. The inner peripheral side projecting part 421 and the outer peripheral side projecting part 422 are respectively formed at the upper end part of the second facing portion 420. Thus, a recessed part 413 opening in the axial direction is formed between the projecting parts 411 and 412 and a recessed part 423 opening in the axial direction is formed between the projecting parts 421 and 422.

Therefore, after the coil 8 is wound around the coil bobbin 80, when the first and the second outer yoke members 41 and 42 are respectively attached on the coil bobbin 8 from both sides in the axial direction so as to surround the coil bobbin 80 from the upper and lower sides, the outer peripheral side projecting part 412 formed at the lower end part of the first opposing portion 410 of the first outer yoke member 41 and the outer peripheral side projecting part 422 formed at the upper end part of the second opposing portion 420 of the second outer yoke member 42 are respectively fitted into the recessed parts 821 and 822 of the engaging protrusion part 82. Also, the protrusion parts 823 and 824 of the engaging protrusion part 82 are respectively fitted in the axial direction to the engaging recessed parts 413 and 423 which are respectively formed at the end part of the first opposing portion 410 and the end part of the second opposing portion 420. Further, the small projecting part 825 of the engaging protrusion part 82 is positioned between the inner peripheral side projecting part 411 which is formed at the lower end face of the first facing portion 410 of the first outer yoke member 41 and the inner peripheral side projecting part 412 which are formed at the upper end face of the second facing portion 420 of the second outer yoke member 42.

The coil bobbin 80 is arranged so as to surround all over the inner yoke 3. Accordingly, the first facing portion 410 and the second facing portion 420 of the first and the second outer yoke members 41 and 42 do not displace radially even though they are attracted by the magnet 9. This is because the first facing portion 410 and the second facing portion 420 are held by the upper and lower protrusion parts 823 and 824 of the coil bobbin 80. In addition, magnetic vibration does not occur when the portion of two facing portions 410 and 420 which is attracted by the magnet 9 is replaced with each other. Therefore, a specific countermeasure is not required to prevent the magnetic vibration.

Further, prescribed clearances are provided between the first and the second outer yoke members 41 and 42 and the engaging protrusion part 82 in the axial direction as shown in FIG. 2(C). In other words, a prescribed clearance is provided in the axial direction between the bottom face of the recessed part 821 and the lower face of the outer peripheral side projecting part 412, and a prescribed clearance is provided between the upper face of the recessed part 822 and the upper face of the outer peripheral side projecting part 422. Also, a prescribed clearance is provided in the axial direction between the upper face of the recessed part 413 and the upper face of the protrusion part 823, and a prescribed clearance is provided between the bottom face of the recessed part 423 and the lower face of the protrusion part 824. Further, a prescribed clearance is also provided in the axial direction between the lower face of the inner peripheral side projecting part 411 and the upper face of the small projecting part 825, and a prescribed clearance is also provided between the upper face of the inner peripheral side projecting part 421 and the lower face of the small projecting part 825.

The size (width) of the recessed part 413 in the radial direction is set to be equal to that of the upper protrusion part 823 and the size (width) of the recessed part 423 in the radial direction is set to be equal to that of the lower protrusion part 824. Therefore, the first facing portion 410 and the second facing portion 420 of the first and the second outer yoke members 41 and 42 do not displace in the radial direction even though the attractive force of the magnet 9 is applied. Accordingly, even though the portion of two facing portions 410 and 420 which is attracted by the magnet 9 is replaced alternately, the magnetic vibration does not occur.

The first and the second outer yoke members 41 and 42 are disposed so as to interpose the coil bobbin 80 between the first and the second outer yoke members 41 and 42 as shown in FIG. 2(B). When the first and the second outer yoke members 41 and 42 are overlaid on the coil bobbin 80 from both sides in the axial direction, the lower end face part 419 of the first outer yoke member 41 firstly abuts with the upper end face part 429 of the second outer yoke member 42 on the outer peripheral side of the coil 8. The abutting of the lower end face part 419 and the upper end face part 429 determines the positions of the first and the second outer yoke members 41 and 42, and in this state, the end portions of the first facing portion 410 and the second facing portion 420 of the first and the second outer yoke members 41 and 42 engage with the engaging protrusion part 82. Consequently, even when the outer yoke 4 is constituted of the first and the second outer yoke members 41 and 42, the magnetic path in the outer yoke 4 is assuredly formed.

In addition, the small projecting part 825 of the engaging protrusion part 82 is positioned between the lower end face of the first facing portion 410 and the upper end face of the second facing portion 420 of the first and the second outer yoke members 41 and 42. Therefore, even when the first opposing portion 410 and the second opposing portion 420 vibrate in the axial direction by external vibrations, the first facing portion 410 and the second facing portion 420 can be surely maintained in a separated condition.

Operation

Figure 3:
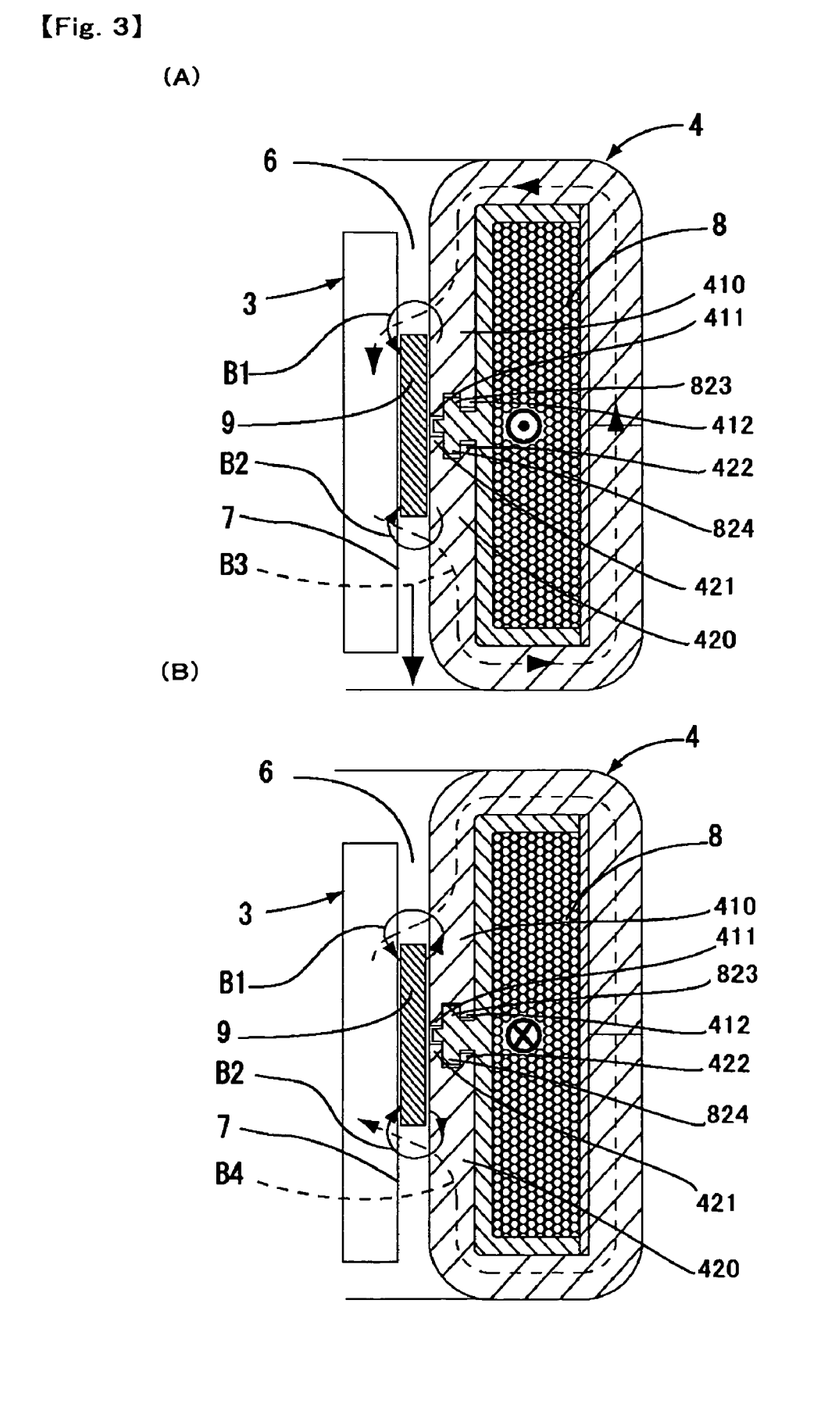
FIGS. 3(A) and 3(B) are explanatory sectional views showing different operated states in the linear actuator.

FIGS. 3(A) and 3(B) are explanatory sectional views showing different operated states of the linear actuator.

In the linear actuator 1 according to the embodiment of the present invention, when the inner face of the magnet 9 is magnetized in "S" pole and its outer face is magnetizing in "N" pole, the magnetic field is formed as shown by the arrowed solid lines B1 and B2 in FIGS. 3(A) and 3(B). In this state, when an alternating current is applied to the coil 8, in a period which the current flows from the far side to the near side in the drawing as shown in FIG. 3(A), the magnetic field shown by the arrow B3 in the dotted line is generated. Therefore, the direction of the magnetic field from the magnet 9 is the same as that of the magnetic lines of force from the coil 8 in the first gap space 6 which is formed between the outer peripheral face of the inner yoke 3 and the first facing portion 410 of the first outer yoke member 41. On the other hand, the direction of the magnetic field from the magnet 9 is opposite to that of the magnetic lines of force from the coil 8 in the second gap space 7 which is formed between the outer peripheral face of the inner yoke 3 and the second facing portion 420 of the second outer yoke member 42. As a result, a downward force (on the second gap space 7 side) in the axial direction is exerted on the magnet 9.

However, in a period which the alternating current flows from the near side to the far side in the drawing as shown in FIG. 3(B), the magnetic field shown by the arrow B4 in the dotted line is generated. Therefore, the direction of the magnetic field from the magnet 9 is opposite to that of the magnetic lines of force from the coil 8 in the first gap space 6 but the direction of the magnetic field from the magnet 9 is the same as that of the magnetic lines of force from the coil 8 in the second gap space 7. As a result, an upward force (on the first gap space 6 side) in the axial direction is exerted on the magnet 9.

As described above, the direction of the force in the axial direction which is applied to the magnet 9 is alternately changed corresponding to the direction of the alternating magnetic field generated by the coil 8. Therefore, the movable body 5 integrally formed with the magnet 9 reciprocally moves in the axial direction and reciprocal linear motion can be outputted from a piston connected with the movable body 5. Further, the outer yoke 4, the inner yoke 3 and the magnet 9 are respectively constituted in an annular shape when viewed from the axial direction and thus a thrust force for the movable body 5 can be obtained over the entire circumferential direction.

Moreover, during the reciprocal operation of the magnet 9 moving back and forth or up and down, even though the portion of the facing portions 410 and 420 attracted by the magnet 9 is replaced alternately, the magnetic vibration can be prevented from occurrence. Therefore, a specific countermeasure is not required to prevent the magnetic vibration.

Example of Pump Device and Compressor Device

The linear actuator 1 in accordance with the embodiment of the present invention can be applied to a pump device or a compressor device as described with reference to FIGS. 4(A), 4(B) and 4(C).

Figure 4:
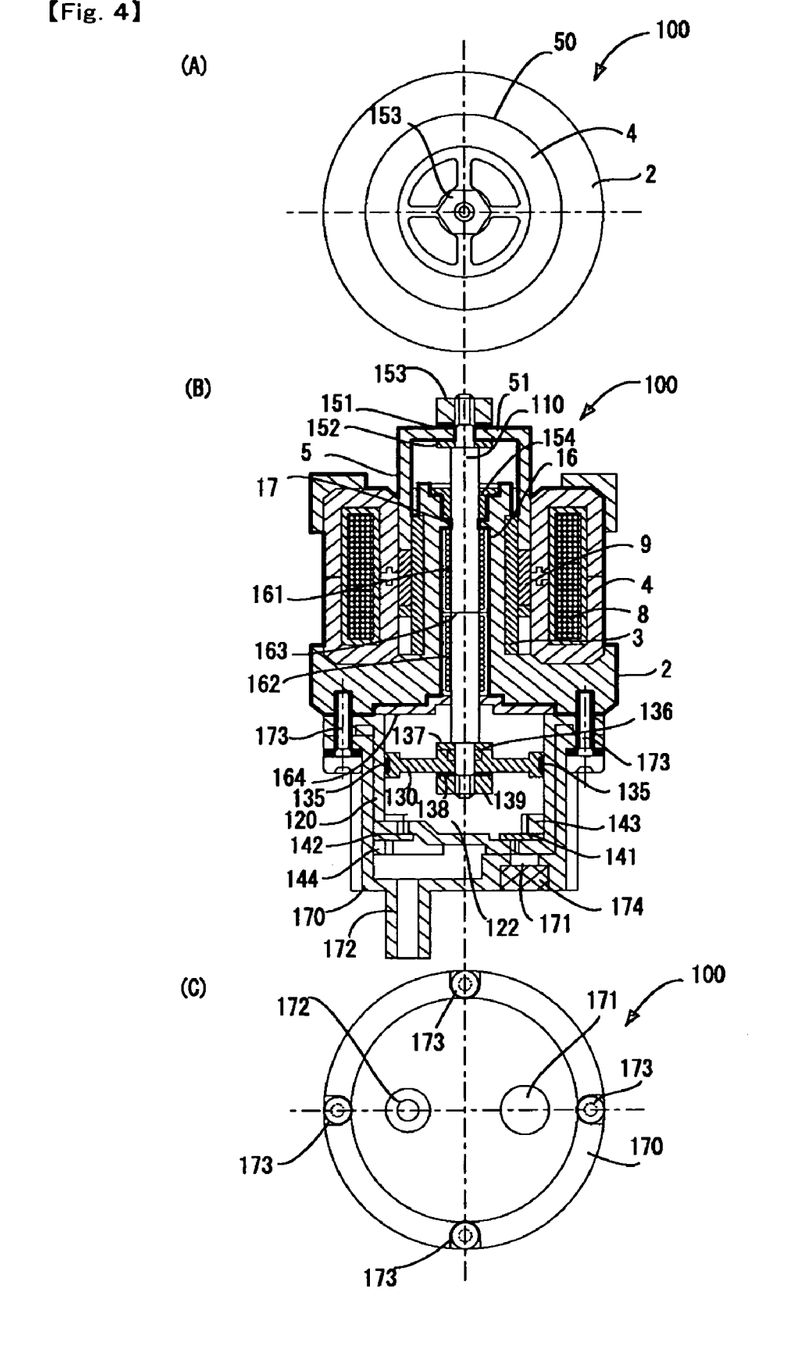
FIG. 4(A) is a plan view of an air pump device which is provided with the linear actuator in accordance with the embodiment of the present invention.
FIG. 4(B) is a cross-sectional view of the air pump device in FIG. 4(A) and FIG. 4(C) is a bottom view of the air pump device.

FIG. 4(A) is a plan view of an air pump device to which the present invention is applied. FIG. 4(B) is a cross-sectional view of the air pump device in FIG. 4(A) and FIG. 4(C) is a bottom view of the air pump device. In FIG. 4(B), a portion corresponding to the linear actuator 1 is enclosed by the thick line.

In the air pump device 100 according to the embodiment of the present invention shown in FIGS. 4(A), 4(B) and 4(C), the base end of an actuating shaft 110 is connected to the movable body 5 of the linear actuator 1 by using a nut 153 through washers 151 and 152. The actuating shaft 110 penetrates through a hole 16 of the frame 2 which holds the inner yoke 3. The base end side of the actuating shaft 110 is supported by a bearing 154 fitted to the frame 2 and two springs 161 and 162 are mounted around the actuating shaft 110. The both ends of the spring 161 provided on the base end side of the actuating shaft 110 are supported by a step part 17 formed on the inner face of the hole 16 of the frame 2 and an "E"-shaped snap ring 163 mounted on the actuating shaft 110. The both ends of the spring 162 provided on the front end side of the actuating shaft 110 are supported by the "E"-shaped snap ring 163 and a spring engaging member 164 fixed on the bottom part of the frame 2.

A case 170 provided with an air inlet port 171 and an air outlet port 172 is fixed on the bottom part of the frame 2 with bolts 173 and a filter 174 is mounted to the air inlet port 171. A cylinder case 120 is arranged inside of the case 170 and a valve 141 is fixed by a valve pressing member 143 on a portion facing the air inlet port 171 in the bottom part of the cylinder case 120. A valve 142 is fixed by a valve pressing member 144 on a portion facing the air outlet port 172.

A piston 130 is disposed inside the cylinder case 120 so as to form a cylinder chamber 122 between the bottom portion of the cylinder case 120 and the spring engaging member 164 fixed on the bottom part of the frame 2. A pressure ring 135 is mounted on the side face of the piston 130 to ensure airtightness with the inner peripheral face of the cylinder case 120.

The piston 130 is fixed at the front end part of the actuating shaft 110 with a nut 139 through washers 137 and 138 and an O-ring 136 and reciprocally moved in the axial direction by the actuating shaft 110. Therefore, when the actuating shaft 110 moves on the base end side in the axial direction (upward in the drawing) by the linear actuator 1, air is taken into the cylinder chamber 122 through the air inlet port 171. When the actuating shaft 110 moves on the front end side in the axial direction (downward in the drawing) by the linear actuator 1, the air in the cylinder chamber 122 is discharged through the air outlet port 172. Therefore, the device operates as an air pump device.

Further, the springs 161 and 162 vibrate sympathetically with the vibration of the actuating shaft 110 and thus a superior pump characteristic can be attained even when an air pump device 100 is equipped with the small-sized linear actuator 1 as described above.

The constitution of the air pump device can be easily modified to a compressor device. In other words, the linear actuator 1 in accordance with the embodiment of the present invention can be similarly applied to a compressor device.

As described above, in the linear actuator in accordance with the embodiment of the present invention, the alternating magnetic field is generated by applying the alternating current to the coil and the movable body is reciprocally driven in the axial direction in conjunction with the alternating magnetic field. Therefore, a reciprocal linear motion can be outputted from the movable body.

Further, the coil bobbin around which the coil is wound is provided with the engaging part which engages with both the first facing portion and the second facing portion of the outer yoke and thus the first facing portion and the second facing portion are not displaced even when the attractive force of the magnet is applied thereto. In addition, the magnetic vibration does not occur when the portion of two facing portions which is attracted by the magnet is alternately replaced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear actuator comprising:
   an inner yoke;
   an outer yoke which is arranged so as to form a prescribed gap space to an outer peripheral face of the inner yoke, the outer yoke comprising:
   a first facing portion which faces the inner yoke; and
   a second facing portion which faces the inner yoke and is formed to be separated from the first facing portion in an axial direction;
   a coil for generating a magnetic field between the outer yoke and the inner yoke;
   an insulating coil bobbin around which the coil is wound, the insulating coil bobbin comprising an engaging part which engages with both the first facing portion and the second facing portion of the outer yoke;
   a magnet which is disposed between the inner yoke and the outer yoke; and
   a movable body integrally connected with the magnet to move in an axial direction.

2. The linear actuator according to claim 1, further comprising:
   a first gap space formed between the first facing portion of the outer yoke and the outer peripheral face of the inner yoke;
   a second gap space formed between the second facing portion of the outer yoke and the outer peripheral face of the inner yoke; and
   an alternating magnetic field generated by the coil at the first gap space and the second gap space so as to form a magnetic path passing through the outer yoke, the first gap space, the inner yoke, the second gap space and the above-mentioned outer yoke,
   wherein the movable body along with the magnet is reciprocally moved in the axial direction in conjunction with the alternating magnetic field.

3. The linear actuator according to claim 1, wherein the coil bobbin is interposed between the coil and the outer yoke so as to ensure an insulation between the coil and the outer yoke and the engaging part provided in the coil bobbin is formed between the first facing portion and the second facing portion of the outer yoke.

4. The linear actuator according to claim 3, further comprising an engaging protrusion part which is formed in the engaging part and protruded toward the inner yoke, wherein a front end portion of the first facing portion of the outer yoke and a front end portion of the second facing portion are respectively engaged with the engaging protrusion part from both sides in the axial direction.

5. The linear actuator according to claim 3, further comprising engaging recessed parts which are respectively formed at a front end portion of the first facing portion of the outer yoke and at a front end portion of the second facing portion to engage with the engaging part provided in the coil bobbin.

6. The linear actuator according to claim 5, further comprising a small projecting part which is formed in the engaging protrusion part and protruded toward the inner yoke from the positions of the engaging recessed parts provided in the front end portions of the first and the second facing portions.

7. The linear actuator according to claim 6, further comprising a first prescribed clearance between the front end portion of the first facing portion and the engaging protrusion part and a second prescribed clearance between the front end portion of the second facing portion and the engaging protrusion part in the axial direction.

8. The linear actuator according to claim 3, wherein the outer yoke comprises a first outer yoke member and a second outer yoke member which are respectively formed in a U-shape cross-section so as to cover the coil from both sides in the axial direction, and the first outer yoke member and the second outer yoke member are constituted in such a manner that both end portions are abutted with each other at a portion located on an outer peripheral side of the coil while the front end portion of the first facing portion and the front end portion of the second facing portion located on an inner peripheral side of the coil respectively engage with the engaging protrusion part from both sides in the axial direction so as to have a prescribed clearance in axial direction between the respective front end portions and the engaging protrusion part.

9. A pump device comprising:
   a linear actuator, the linear actuator comprising:
   an inner yoke;
   an outer yoke which is arranged so as to form a prescribed gap space to an outer peripheral face of the inner yoke, the outer yoke comprising:
   a first facing portion which faces the inner yoke; and
   a second facing portion which faces the inner yoke and is formed to be separated from the first facing portion in an axial direction;
   a coil for generating a magnetic field between the outer yoke and the inner yoke;
   an insulating coil bobbin around which the coil is wound, the insulating coil bobbin comprising an engaging part which engages with both the first facing portion and the second facing portion of the outer yoke; and
   a magnet which is disposed between the inner yoke and the outer yoke; and
   a movable body integrally connected with the magnet to move in an axial direction.

10. The pump device according to claim 9, wherein the linear actuator further comprises:
    a first gap space formed between the first facing portion of the outer yoke and the outer peripheral face of the inner yoke;
    a second gap space formed between the second facing portion of the outer yoke and the outer peripheral face of the inner yoke; and
    an alternating magnetic field generated by the coil at the first gap space and the second gap space so as to form a magnetic path passing through the outer yoke, the first gap space, the inner yoke, the second gap space and the above-mentioned outer yoke,
    wherein the movable body along with the magnet is reciprocally moved in the axial direction in conjunction with the alternating magnetic field, the coil bobbin is interposed between the coil and the outer yoke so as to ensure an insulation between the coil and the outer yoke and the engaging part provided in the coil bobbin is formed between the first facing portion of the outer yoke and the second facing portion.

11. The pump device according to claim 10, wherein the coil bobbin further comprises an engaging protrusion part which is formed in the engaging part and protruded toward the inner yoke and the outer yoke further comprises a front end portion of the first facing portion and a front end portion of the second facing portion which are respectively engaged with the engaging protrusion part from both sides in the axial direction.

12. The pump device according to claim 11, wherein the outer yoke further comprises engaging recessed parts which are respectively formed at a front end portion of the first facing portion and at a front end portion of the second facing portion of to engage with the engaging part provided in the coil bobbin.

13. The pump device according to claim 9, further comprising a piston which is connected with the movable body integrally moved with the magnet and capable of axially moving in a cylinder, wherein the piston is reciprocally moved by applying an alternating current to the coil.

14. A compressor device comprising:
    a linear actuator, the linear actuator comprising;
    an inner yoke;
    an outer yoke which is arranged so as to form a prescribed gap space to an outer peripheral face of the inner yoke, the outer yoke comprising:
    a first facing portion which faces the inner yoke; and
    a second facing portion which faces the inner yoke and is formed to be separated from the first facing portion in an axial direction;
    a coil for generating a magnetic field between the outer yoke and the inner yoke;
    an insulating coil bobbin around which the coil is wound, the insulating coil bobbin comprising an engaging part which engages with both the first facing portion and the second facing portion of the outer yoke; and
    a magnet which is disposed between the inner yoke and the outer yoke; and
    a movable body integrally connected with the magnet to move in an axial direction.

15. The compressor device according to claim 14, wherein the linear actuator further comprises:
    a first gap space formed between the first facing portion of the outer yoke and the outer peripheral face of the inner yoke;
    a second gap space formed between the second facing portion of the outer yoke and the outer peripheral face of the inner yoke; and
    an alternating magnetic field generated by the coil at the first gap space and the second gap space so as to form a magnetic path passing through the outer yoke, the first gap space, the inner yoke, the second gap space and the above-mentioned outer yoke,
    wherein the movable body along with the magnet is reciprocally moved in the axial direction in conjunction with the alternating magnetic field, the coil bobbin is interposed between the coil and the outer yoke so as to ensure an insulation between the coil and the outer yoke and the engaging part provided in the coil bobbin is formed between the first facing portion of the outer yoke and the second facing portion.

16. The compressor device according to claim 15, wherein the coil bobbin further comprises an engaging protrusion part which is formed in the engaging part and protruded toward the inner yoke and the outer yoke further comprises a front end portion of the first facing portion and a front end portion of the second facing portion which are respectively engaged with the engaging protrusion part from both sides in the axial direction.

17. The compressor device according to claim 16, wherein the outer yoke further comprises engaging recessed parts which are respectively formed at a front end portion of the first facing portion and at a front end portion of the second facing portion of to engage with the engaging part provided in the coil bobbin.

18. The compressor device according to claim 14, further comprising a piston which is connected with the movable body integrally moved with the magnet and capable of axially moving in a cylinder, wherein the piston is reciprocally moved by applying an alternating current to the coil.

19. A linear actuator comprising:

an inner yoke;

an outer yoke spaced from the inner yoke to define a gap space therebetween, the outer yoke including:
- a first facing portion facing the inner yoke; and
- a second facing portion facing the inner yoke and separated from the first facing portion in an axial direction;

a magnet which is disposed in the gap space and operable to move in an axial direction;

an insulating coil bobbin around which a coil for generating a magnetic field between the outer yoke and the inner yoke is wound, the insulating coil bobbin including an engaging part which engages with both the first facing portion and the second facing portion of the outer yoke to prevent displacement of the first and second portions of the outer yoke in a radial direction.

20. The linear actuator according to claim 19, wherein the engaging part comprises:
- an upper protrusion part received in a recess of the first facing portion;
- a lower protrusion part received in a recess of the second facing portion;
- wherein a first prescribed clearance is formed in the recess of the first facing portion and a second prescribed clearance is formed in the recess of the second facing portion.

* * * * *